Patented Jan. 9, 1940

2,186,910

UNITED STATES PATENT OFFICE 2,186,910

OXIDIZED WAX AND METHOD FOR PRODUCING SAME

Ralph C. Pollock, Long Beach, Calif., assignor to Union Oil Company of California, Los Angeles, Calif., a corporation of California No Drawing. Original application September 3, 1935, Serial No. 38,961. Divided and this application December 12, 1936, Serial No. 115,588

9 Claims. (Cl. 87—9)

The present invention relates to oxidized paraffinic substances and to methods for producing the same. The invention relates particularly to oxidized waxes. This application is a division of my co-pending application Serial No. 38,961, filed Sept. 3rd, 1935.

It is well known to oxidize wax or other paraffinic substances with an oxygen-containing gas such as air or oxygen while maintaining the charge at an elevated temperature. However, the products produced by such oxidation with air or oxygen are very black and are very difficult to treat with acid, such as sulfuric acid, in order to effect their purification. Oxidation of paraffinic substances with air or oxygen produce a non-homogeneous product containing granular carbonaceous material, the product being sparingly soluble in lubricating oils when it is desired to employ the same as a pour point depressant or as a wax separation aid. When such materials are added to lubricating oils they darken the oil to such extent as to require a retreatment with sulfuric acid and/or clay. Consequently, such materials are deleterious to the oil when added thereto.

I have discovered that valuable oxidized and/or polymerized compounds which are particularly adapted to be employed as pour point depressants, wax separation aids, extreme pressure bases and the like, may be produced by carrying out the oxidation reaction with hydrogen peroxide. I have particularly found it to be desirable to effect the oxidation with hydrogen peroxide by introducing a stream of oxygen or air or other oxygen-containing gases into the charge while maintaining the latter at an elevated temperature.

In general, the oxidation reaction is carried out by heating the charge and adding hydrogen peroxide while agitating the charge at the elevated temperature. The rate of adding hydrogen peroxide is such as to prevent an overly violent reaction and to permit the full utilization of the liberated nascent oxygen so that there will be a minimum escape of the undecomposed hydrogen peroxide. This, in general, means that it must be added slowly such as by the drop-wise method in laboratory apparatus. However, any hydrogen peroxide that may escape may pass through a condenser with the steam produced in the process and thus be recovered. It is desirable to agitate the charge during oxidation, preferably by a current of air or other non-reducing gas in order to prevent too violent local reaction with excessive frothing and failure to obtain uniform contact. I prefer to use air for agitation because I obtain additional oxidation from the oxygen in the air which appears to be activated and the reaction, therefore, catalyzed by the hydrogen peroxide. The temperature to which the material to be oxidized is heated will, of course, depend upon the nature of the particular charge to be oxidized. I have found in the oxidation of iso-paraffins, a suitable temperature to be in the neighborhood of 350 to 400° F.

Another method which I have found effective for oxidizing paraffins resides in passing a current of air or oxygen through a separate vessel containing the hydrogen peroxide and thence passing the activated air or oxygen into the charge while maintaining the latter at an elevated temperature. In this procedure the oxidation is, in effect, carried out with the air or oxygen, the hydrogen peroxide merely acting in the nature of a catalyst to speed up the oxidation reaction. Therefore, a considerable saving will be made in the use of hydrogen peroxide when employing this process.

I have also discovered that valuable pour point depressants, wax separation aids, etc., may be produced by the oxidation of certain types of paraffinic materials. I have found that the oxidized iso-paraffins are particularly adapted for use as pour point depressants and wax separation aids. The iso-paraffins are oxidized into substances which are of a gummy non-crystalline structure. They are distinguished from the oxidized waxes by a remarkably low melting point and a rubbery rather than a waxy consistency. When the iso-paraffins have been oxidized with hydrogen peroxide, the resulting product is characterized by a light color rather than by the very black appearance of the wax oxidized with air or oxygen. This is perhaps due to the bleaching action of the hydrogen peroxide.

I have also discovered that it is beneficial to prepare the stock to be oxidized for more effective oxidation by removing the undesirable impurities from the stock such as resins, reactive oil fractions, etc. However, certain types of materials among those mentioned above require no treatment, chemically or otherwise, previous to oxidation to produce the active wax separation aid or pour point depressant.

Preferably, when producing the oxidized substances from slack wax or waxes containing considerable quantities of oil, the crude wax is first deoiled to a low oil content. This may be accomplished by dissolving the wax in a suitable solvent such as propane, then chilling the solution to reprecipitate the wax and filtering the mixture. If desired, the crude wax may be washed with cold propane or other suitable cold solvent to separate the oil from the crude material. Also, if desired, the wax may be sweated to remove the contained oil in accordance with known methods.

The crude deoiled wax should be subsequently acid treated. This is for the purpose of removing asphalt resins and other easily oxidized materials which seem to be reactive with the hydrogen peroxide in preference to the paraffinic components. In other words, it has been found that when wax is contaminated with large quantities of low A. P. I. gravity materials these latter materials prevent the proper course of oxidation to such extent that it is not feasible to produce the pour point depressant or a wax separation aid from such stocks. The acid treatment also reduces the ratio of oil to wax in the slack wax and leaves only the more stable oils in the slack wax. When the wax has been sufficiently deoiled, the acid treatment may not be necessary providing no considerable proportion of asphalt or resinous materials are present in the wax. If desired, the crude slack wax may be deoiled and deresinated by spraying the wax at an elevated temperature above its melting point into a bath of liquid propane or other liquefied normally gaseous hydrocarbons or even normally liquid hydrocarbons maintained at a low temperature, say from —20 to —40° F. This causes the wax to solidify in discrete particles. Sufficient time is then allowed for the propane to leach the oil from the solidified particles. The wax may then be heated to above its melting point and allowed to stand. By decanting the wax while fluid, it will be found that the asphalt and resinous materials have settled to the bottom of the vessel.

The acid treatment will, of course, vary with the type of crude wax treated but will usually be about 10 to 25° F. above the melting point of the wax. The acid treatment should be carried out in stages employing the proper amount of acid such as sulfuric acid consistent with good settling of sludge produced by the reaction with the acid. The sludge produced from the first dump of acid may be quite viscous, especially if not withdrawn promptly. Therefore, care should be taken to obtain sufficient agitation in settling without permitting the sludge to have time to thicken excessively. After the last of the sludge has separated from the wax, the latter is heated to a temperature of approximately 240 to 300° F. which is sufficient to reduce the viscosity of the wax for alkali treatment and water washing. The water washing between the acid and alkali treatments may be started immediately after withdrawal of the sludge and may be continued as the temperature is raised. The water washing need not be extremely thorough to remove soaps and excess caustic after neutralization. In fact, the presence of a small amount of sodium compounds have been found to be beneficial to the subsequent oxidation stage.

The degree of oxidation will determine the character of the resulting product and thus the uses for which the resulting product is suitable. In the early stages of oxidation, the product is a soft viscous, sticky material which is moderately soluble in lubricating oil and which is particularly adapted to be employed as a pour point depressant and wax separation aid. In the later stages of oxidation under the same oxidation conditions, the material assumes the character of an elastic rubber-like material which is particularly adapted to be used as a rubber substitute. I have found that the latter material is also particularly adapted to be used as a varnish or lacquer base. In the intermediate stages of oxidation, that is, between the time the material is suitable as a pour point depressant or wax separation aid and the time it assumes rubber-like characteristics, the material is a gummy substance which is particularly adapted to be used as a base for extreme pressure lubricants.

When it is desired to use the oxidized material as a pour point depressant, a small amount of the material, say 0.5 to 1% by weight, is added and thoroughly incorporated into the oil. A like amount is also added to oils to be dewaxed, the mixture then being chilled to a temperature sufficiently low to crystallize the wax. The mixture may then be filtered, centrifuged or cold settled to remove the precipitated wax from the oil. In many cases, it is desirable to dilute the mixture of wax-bearing oil and wax separation aid with a suitable diluent prior to the chilling step in order to render the oil fluent at the dewaxing temperature. As diluents for the wax-bearing oil, I may employ liquefied normally gaseous hydrocarbons such as ethane, ethylene, propane, propylene, butane, butylene or mixture thereof, light hydrocarbons such as pentane, hexane, heptane, octane, nonane, or hydrocarbon fractions such as naphtha, gasoline, kerosene or gas oil. I may also employ such diluents as acetone, mixtures of acetone and benzol, ethyl alcohol, propyl alcohol, butyl alcohol, methyl ethyl ketone, diethyl ketone, methyl propyl ketone, ethylpropyl ketone, cyclohexanone, normally gaseous and normally liquid ethers, methyl chloride, dichlorethylene or trichlor ethylene or mixtures of these materials with the aforementioned hydrocarbons.

The use of a liquefied normally gaseous diluent such as liquid propane is preferred since in addition to having the property of retaining less wax in solution at low temperatures, it may be employed to produce the necessary degree of refrigeration to precipitate the wax from the solution by vaporizing a portion of the diluent from the diluted oil under reduced pressure.

It is an object of my invention to produce oxidized materials from paraffinic substances such as iso-paraffins, waxes such as scale wax, slack wax, chemically refined water white high or low melting point waxes, petrolatum, ceresin and the like, said oxidized materials being particularly adapted to be used for lowering the pour point of oils such as lubricating oils or as wax separation aids to be employed in conjunction with dewaxing of oils. It is also an object of my invention to employ such substances as bases for extreme pressure lubricants and the like.

A further object of my invention resides in the production from the foregoing mentioned paraffinic substances, oxidized waxes which are highly elastic and resemble rubber-like materials which may be employed as crude rubber stock in the production of rubber and which are resistant to oils and solvents.

Many specific objects, features and advantages of my invention will become apparent to those skilled in the art as the description of my invention proceeds which is more fully described below and in which specific examples of carrying out the invention are given. However, it will be observed that the examples given below are not to be considered as limiting my invention but are merely illustrative of methods of carrying it out.

Example 1

As raw material to be oxidized with hydrogen peroxide, a quantity of iso-paraffins having a melting point of 115° F., as determined by the Ubbelohde method, was obtained by fractionation of the slack wax produced in the dewaxing of a 500° F. flash point lubricating oil distillate produced from a Santa Fe Springs crude oil. The iso-paraffins were fractionated from the higher melting, normal or straight chain paraffins by fractional crystallization of the slack wax from an acetone-benzene solution. The normal or higher melting point paraffin waxes are the first to precipitate upon chilling and are removed by filtration. Further chilling of the mother liquor causes the precipitation of the lower melting point iso-paraffins. These iso-paraffins have substantially the same molecular weight as the high melting point normal or straight chain waxes obtained from the same stock and are not to be confused with normal or straight chain waxes of the same melting point but of a lower molecular weight. They are also not be confused with mixtures of normal paraffins and oil having the same melting point as the oil-free iso-paraffins.

A charge of the above iso-paraffins was heated in a vessel to a temperature of 360 to 400° F.; then while air was being passed through the melted material, hydrogen peroxide of 35% concentration was added slowly to the heated charge at a rate sufficiently rapid to cause bubbling of the charge and yet not so rapid as to cause the entire charge to froth excessively and overflow the vessel. The oxidation was carried out for approximately 23 hours. At the termination of the oxidation reaction, the resulting product was gummy, sticky, non-crystalline, semi-fluid substance having a rather light brown color.

In order to demonstrate the effect of the above oxidized iso-paraffins as a pour point depressant, a ½ gram sample of the material was incorporated into a 100 c. c. sample of an S. A. E. 30 lubricating oil produced from a Pennsylvania type crude oil and having a pour point of 15° F. The pour point of the resulting mixture was lowered to −10° F. The addition of the oxidized iso-paraffins to the lubricating oil did not change the color of the original oil.

Example 2

A charge of slack wax separated from a lubricating oil distillate produced from a Santa Fe Springs crude oil and having an S. A. E. grade of 70 when refined, that is, after separating the wax and low grade lubricating oil fractions, such as those which are soluble in selective solvents such as sulfur dioxide and the like, was subjected to oxidation in the same manner as described in Example 1, except that the oxidation reaction was carried out for approximately 12 hours. The finished product had a darker appearance than the oxidized refined iso-paraffins.

When a one-half gram sample of the above material was mixed with 100 c. c. of lubricating oil having a pour point of 15° F., the pour point of the resulting mixture was reduced to −5° F. The addition of the above oxidized wax to the lubricating oil did not change its color appreciably.

Example 3

A charge of the slack wax described in Example 2 was first deoiled. This was accomplished by dissolving the slack wax in approximately four volumes of liquid propane under pressure and at a temperature of about 100° F. and then chilling the mixture to −40° F. by allowing a portion of the propane to vaporize under reduced pressure. This caused the wax to precipitate from solution which was then removed by filtration. The deoiled wax had a melting point of 168° F. as determined by the Ubbelohde method and an oil content of 40% as determined by the acetone-benzene method which consists in extracting the oily wax with a mixture of 65% by volume of acetone and 35% benzene in an amount of 50 ml. of solvent to one gram of wax and separating the wax at −10° F. by filtration. The amount of oil dissolved by the acetone-benzene mixture represents the amount of oil originally present in the wax. The aforementioned deoiled wax was then acid treated and neutralized with clay. The above wax was then oxidized for approximately 51 hours according to the method described in Example 1.

When one-half gram of the above oxidized material was added to a 100 c. c. sample of lubricating oil having a pour point of 25° F., it lowered to pour point of the oil to 0° F.

Example 4

In another run, a slack wax obtained from a Santa Fe Springs crude oil distillate having an S. A. E. grade of 50 when refined wax deoiled by extraction with a mixture of 75% benzene and 25% acetone. The deoiled wax had a melting point (Ubbelohde) of 167° F. The wax was oxidized with hydrogen peroxide in a stream of air as described in Example 1 for 8¾ hours at a temperature of 380 to 420° F. The finished product had an acid number of 95 and a saponification number of 238 and was quite light in color.

In order to determine the potency of the above material as a wax separation aid, 0.5% by weight of the oxidized material was mixed at a temperature of about 130° F. with a lubricating oil distillate having an S. A. E. grade of 20 when refined and the mixture was then mixed with approximately 4.5 volumes of liquid propane under superatmospheric pressure. The temperature of the resulting mixture was about 130° F. and the pressure was about 250 lbs. per square inch. The mixture of waxy lubricating oil, propane and wax separation aid was then chilled externally at a rate of approximately 3° F. per minute to approximately −40° F., the refrigeration being accomplished by vaporizing under gradually reduced pressure a portion of propane in the jackets surrounding the chilling vessel. The chilled slurry of propane, lubricating oil, solidified wax and wax separation aid wax filtered under a pressure of about 25 lbs. per square inch to effect the separation of the precipitated wax and wax separation aid from the propane solution of the lubricating oil. The filter rate was 11.5 gallons per square foot per hour of filter surface based on the propane free oil. A yield of dewaxed oil of 86.9% by volume was obtained having a pour point of 0° F. The wax separated from the oil had a melting point (Ubbelohde) of 128° F.

The foregoing results indicate that this type of wax modifier is quite active in dewaxing oils when compared with a blank run, wherein no wax separation aid is employed. A blank run on the same oil and using the same amount of propane and carried out under the same dewaxing conditions, as above, showed that only 65.7% by volume of oil was obtained having a pour point of −5° F. The wax separated from the oil had a melting point of only 115° F.

*Example 5*

In another run a portion of the deoiled wax described in Example 4 was oxidized with hydrogen peroxide in a current of air as described in Example 1 for approximately 8 hours while maintaining the charge at temperatures of about 360° F. to 420° F. for the first 7 to 7½ hours with a final increase in temperature from 500 to 600° F. The resulting product was a highly elastic rubber-like material which was found to be insoluble in benzene, toluene, alcohol, acetone, cleaners' naphtha, 86° Baumé naphtha, carbon tetrachloride, ether, cloroform and carbon bisulfide. A portion of this product was washed with cleaners' naphtha to remove small amounts of interchanged oil and paraffin and the washed product was found to be considerably more elastic and rubber-like than the original unwashed material. A portion of the washed product was then vulcanized with 9% by weight of sulfur for three hours at temperatures between 266° F. and 284° F. The resulting product had much the appearance of vulcanized rubber.

It will be observed that the foregoing description of my invention is not to be considered as limiting as many variations thereof may be made by those skilled in the art within the scope of the following claims.

I claim:

1. A lubricating oil having a relatively low pour point comprising a mixture of lubricating oil having a relatively high pour point and paraffin wax oxidized with hydrogen peroxide, said oxidized paraffin wax having an acid number of about 95 and a saponification number of about 238.

2. A lubricating oil having a relatively low pour point comprising a mixture of lubricating oil having a relatively high pour point and a paraffin wax oxidized with hydrogen peroxide.

3. A lubricating oil having a relatively low pour point comprising a mixture of lubricating oil having a relatively high pour point and a paraffin wax oxidized with hydrogen peroxide in a current of oxygen-containing gas, said oxidized paraffin wax having a soft viscous and sticky consistency and having a light color so as to not darken the lubricating oil perceptibly.

4. A lubricating oil having a relatively low pour point comprising a mixture of lubricating oil having a relatively high pour point and 0.5 to 1% by weight of paraffin wax oxidized with hydrogen peroxide.

5. A lubricating oil having a relatively low pour point comprising a mixture of lubricating oil having a relatively high pour point and 0.5 to 1% by weight of paraffin wax oxidized with hydrogen peroxide in a current of oxygen-containing gas.

6. A lubricating oil having a relatively low pour point comprising a mixture of a lubricating oil having a relatively high pour point and a small amount of an oxidized iso-paraffin, said oxidized iso-paraffin being gummy, sticky, non-crystalline, semi-fluid and having a light brown color and said mixture of lubricating oil and iso-paraffin having substantially the same color as said lubricating oil of relatively high pour point.

7. A lubricating oil having a relatively low pour point comprising a mixture of a lubricating oil having a relatively high pour point and a small amount of an oxidized iso-paraffin derived from the action of a hydrogen peroxide on an iso-paraffin.

8. A lubricating oil having a relatively low pour point comprising a mixture of a lubricating oil having a relatively high pour point and a small amount of an oxidized iso-paraffin derived from the action of hydrogen peroxide in a current of an oxygen containing gas on an iso-paraffin.

9. A lubricating oil having a relatively low pour point comprising a mixture of a lubricating oil having a relatively high pour point and a small amount of an oxidized iso-paraffin, said oxidized iso-paraffin being gummy, sticky, non-crystalline, semi-fluid and having a light brown color and being derived by the oxidation of the relatively lower melting point fractions of petroleum wax and said mixture of lubricating oil and oxidized iso-paraffin having substantially the same color as said lubricating oil of relatively high pour point.

RALPH C. POLLOCK.